US008996562B2

(12) United States Patent
Warren

(10) Patent No.: US 8,996,562 B2
(45) Date of Patent: Mar. 31, 2015

(54) COMPUTER-IMPLEMENTED METHOD AND SYSTEM FOR ENABLING ANONYMOUS COMMUNICATION BETWEEN NETWORKED USERS BASED ON COMMON SEARCH QUERIES

(76) Inventor: Peter Warren, Ashland, OR (US)

( * ) Notice: Subject to any disclaimer, the term of this patent is extended or adjusted under 35 U.S.C. 154(b) by 1389 days.

(21) Appl. No.: 11/292,605

(22) Filed: Dec. 1, 2005

(65) Prior Publication Data

US 2007/0130122 A1 Jun. 7, 2007

(51) Int. Cl.
  *G06F 7/00* (2006.01)
  *G06Q 10/10* (2012.01)
(52) U.S. Cl.
  CPC .............. *G06Q 10/10* (2013.01); *G06Q 10/107* (2013.01)
  USPC ........................................................ 707/769
(58) Field of Classification Search
  USPC ............. 707/104.1, 100, 10, 5, 7, 3, 999.101, 707/999.102, 769
  See application file for complete search history.

(56) References Cited

U.S. PATENT DOCUMENTS

| 5,164,897 | A | | 11/1992 | Clark et al. |
| 5,519,859 | A | * | 5/1996 | Grace ............................ 707/690 |
| 6,128,660 | A | | 10/2000 | Grimm et al. |
| 6,212,548 | B1 | | 4/2001 | DeSimone et al. |
| 6,546,398 | B1 | * | 4/2003 | Simon ............................ 707/769 |
| 6,615,248 | B1 | * | 9/2003 | Smith ............................ 709/217 |
| 6,651,086 | B1 | | 11/2003 | Manber et al. |
| 6,691,155 | B2 | | 2/2004 | Gottfried |
| 6,708,162 | B1 | * | 3/2004 | Morgan et al. ......................... 1/1 |
| 6,732,088 | B1 | * | 5/2004 | Glance ................................... 1/1 |
| 6,745,178 | B1 | | 6/2004 | Emens et al. |
| 7,774,331 | B2 | * | 8/2010 | Barth et al. .................... 707/706 |
| 2001/0054041 | A1 | | 12/2001 | Chang |
| 2001/0054064 | A1 | | 12/2001 | Kannan |
| 2002/0032735 | A1 | * | 3/2002 | Burnstein et al. ............. 709/204 |
| 2002/0116391 | A1 | * | 8/2002 | Nadkarni ................... 707/104.1 |
| 2004/0215782 | A1 | | 10/2004 | Syed |
| 2004/0225716 | A1 | * | 11/2004 | Shamir et al. ................. 709/204 |
| 2005/0216953 | A1 | | 9/2005 | Ellingson |
| 2006/0074843 | A1 | | 4/2006 | Pereira |
| 2006/0161542 | A1 | * | 7/2006 | Cucerzan et al. .................. 707/5 |
| 2006/0248059 | A1 | * | 11/2006 | Chi et al. ............................ 707/3 |
| 2007/0016585 | A1 | * | 1/2007 | Nickell et al. .................... 707/10 |
| 2007/0094268 | A1 | * | 4/2007 | Tabe .................................. 707/10 |

\* cited by examiner

*Primary Examiner* — Hosain Alam
*Assistant Examiner* — Eliyah S Harper
(74) *Attorney, Agent, or Firm* — Inventive Patent Law P.C.; Jim H. Salter

(57) ABSTRACT

A computer-implemented method and system for enabling anonymous communications between networked users based on common search queries is disclosed. The present invention relates to a computer-implemented system and method for receiving a first search query from a first user, receiving a second search query from a second user, at least the first user or the second user being unidentified, determining if the first search query and the second search query fit within a match criteria, and establishing a communication link between the first user and the second user if the first search query and the second search query fit within the match criteria.

29 Claims, 12 Drawing Sheets

*scholarly articles chicken life span - Google Search - Mozilla Firefox*

File Edit View Go Bookmarks Tools Help http://localhost/servlet/Search?hl=en&port=8&q=chicken+life+span&btn

E*TRADE FINANCIA...

SeekSpeak  Web Images Groups News Froogle Local more
chicken life span   [Search]  Advanced Search  Preferences

Web  Results 1 - 10 of about 28,800 for scholarly articles chicken life span. (0.25 seconds)

Talk with others about chicken life span    Sponsored Links chicken life span
life span of a chicken on farm
How long do chickens live?

Journal Articles
Use Google Scholar to find journal articles, abstracts & more! See how
scholar.google.com

How long do chickens live?    [X]
you: hi, do you know how long chickens live?
them: it depends how much they exercise.

722

Type text to send:

[                                    ]   [Send]

724

Thomas E. Hecker - The Twilight of Digitization Is Now - Journal ...
Contemporary wisdom holds that the scholarly community is in transition from ... In 1995,
Andrew M. Odlyzko published an article called 'Tragic Loss or Good ...
muse.jhu.edu/journals/journal_of_scholarly_publishing/v035/35.1hecker.html - Similar pages

[PDF] The Twilight of Digitization Is Now
File Format: PDF/Adobe Acrobat
Contemporary wisdom holds that the scholarly community is in transition ... In 1995, Andrew
M. Odlyzko published an article called ...
muse.jhu.edu/journals/journal_of_scholarly_publishing/v035/35.1hecker.pdf - Similar pages Research Foundation Honors Leading Faculty Scholars and Scientists
He is the author of almost 200 scholarly articles and nine books, many of which have been
... responsible for chicken pox, interacts with human cells. ...
www.rfsuny.org/rf_news/2005-05_honorees.htm - 65k - Cached - Similar pages javascript:seekSpeak('How long do chickens live?', document.getElementById('div3'))

COMPUTER-IMPLEMENTED METHOD AND SYSTEM FOR ENABLING ANONYMOUS COMMUNICATION BETWEEN NETWORKED USERS BASED ON COMMON SEARCH QUERIES

BACKGROUND

1. Field of the Invention

This invention relates to methods and systems for enabling communications between networked users. More particularly, the present invention relates to enabling anonymous communications between networked users based on common search queries.

2. Related Art

People search the Internet for resources related to a particular query. These resources include html pages, sound files, movie clips, pictures, scholarly articles, newsgroups, etc. Unavailable in this mix of resources have been the users themselves, who are potential sources of advice, companionship, expertise, etc. Up to now, there has been no simple way to enable communication among users who are searching for similar topics.

There are many ways to communicate with other users based on long-standing interest in a given topic, such as newsgroups, chat rooms, and the like. People using these modes of communication establish themselves via registration as a member of a certain group, chat room, or community. They may then communicate with others within that group.

There are also ways to communicate with other friends or associates via instant messaging applications. These applications allow users to communicate with other known users based on some sort of user identifier. But before the users can communicate, at least one user needs to know the other user. In other words, the users have to have contact before they can communicate. Additionally, each user has to be running an instant messaging application that can receive messages from other users. Due to proprietary communication protocols, most instant messaging applications will not interoperate with instant messaging applications from another vendor. This lack of interoperability has led to tremendous headaches for users, as they must use several different instant messaging applications to be able to communicate with different people. Another option is to use a single application that cobbles together the different protocols from different vendors. Unfortunately these applications frequently break and require updating due to changes in the protocols.

The prior art does not provide a way to connect, without registration of any sort, with others who are searching for a similar topic at approximately the same time. In the prior art, a person must be a member of a group or community to be able to communicate with another person or the identity of the receiving party must be known to the communicating party. In the prior art, people cannot connect on the Internet in an immediate and serendipitous way based on potentially transitory and fleeting interests. Prior art systems require a user to run standalone applications, register, or establish a profile.

The following United States Patents and patent applications describe various types of computer based systems related to networked communications and network search tools.

U.S. patent application No. US20020032735A1, titled, "Apparatus, means and methods for automatic community formation for phones and computer networks", describes an automatic telephone, Internet or intranet community formation system that utilizes spoken words or matching search terms. The described system utilizes wireless and wired voice communications, database and list serve technology to archive and match users based upon their search terms entered into a telephone system or a search engine, Internet, intranet, extranet, local area network, wide area networked, wired, wireless or standalone computer. A community formation system refers to a means of inviting one or more persons to communicate via voice, email or other method and join in a discussion. Invitations to join would be sent via an email, SMS, instant messaging, phone, web browser, email or fax communication. The user would have control over whether s/he wanted to be invited into a community, the age of desired matches, the closeness or breadth of the matches, the duration of the community, and the type of community—voice or text. Also, users have the ability to a.) conduct joint searches and b.) jointly and severally rate the content information, websites, or other subjects, and c.) to pick settings to establish his or her actual identity or to adopt an anonymous identity. However, the described system requires user registration and/or custom software installation, does not provide firewall-friendly communication, and does not provide complete user anonymity.

U.S. patent application No. US20050102358A1, titled, "Web page monitoring and collaboration system", describes an Internet system that includes a server that communicates with a web page including a universal resource locator address of an Internet based chat session, and allows each user visiting the monitored webpage to participate in the Internet based chat session. However, this system does not address the notion of connectivity based on similar search terms. It centralizes communication around a single web page (or web site) and does not describe a system that enables communication based on exact search terms or similar but not exact search terms.

U.S. Pat. No. 6,912,564, titled, "System for instant messaging the sender and recipients of an e-mail message", describes a communication system for the transfer of email through mobile phones that automatically configures instant messaging communication between intended recipient and sender of email after determination of capable user. However, this system requires the users to know the identity of others users with whom they wish to communicate.

U.S. patent application No. US20040243580A1, titled, "System and method for message handling in a peer-to-peer environment", describes an entity access method (e.g. for media items in peer-to-peer network) involving receiving a request including metadata corresponding to an entity seeking access to an entity. However, this system does not describe a method and system for enabling anonymous communications between networked users based on common search queries.

Thus, a computer-implemented method and system for enabling anonymous communications between networked users based on common search queries is needed.

BRIEF DESCRIPTION OF THE DRAWINGS

The present invention is illustrated by way of example and not limitation in the figures of the accompanying drawings, in which:

FIGS. 7a and 7b are screen shot examples of a search query results page with a transmitted text box and a received text box with sent and received text messages.

DETAILED DESCRIPTION

A computer-implemented method and system for enabling anonymous communications between networked users based on common search queries is disclosed. In the following description, numerous specific details are set forth. However, it is understood that embodiments of the invention may be practiced without these specific details. In other instances, well-known processes, structures and techniques have not been shown in detail in order not to obscure the understanding of this description.

Figure 1:
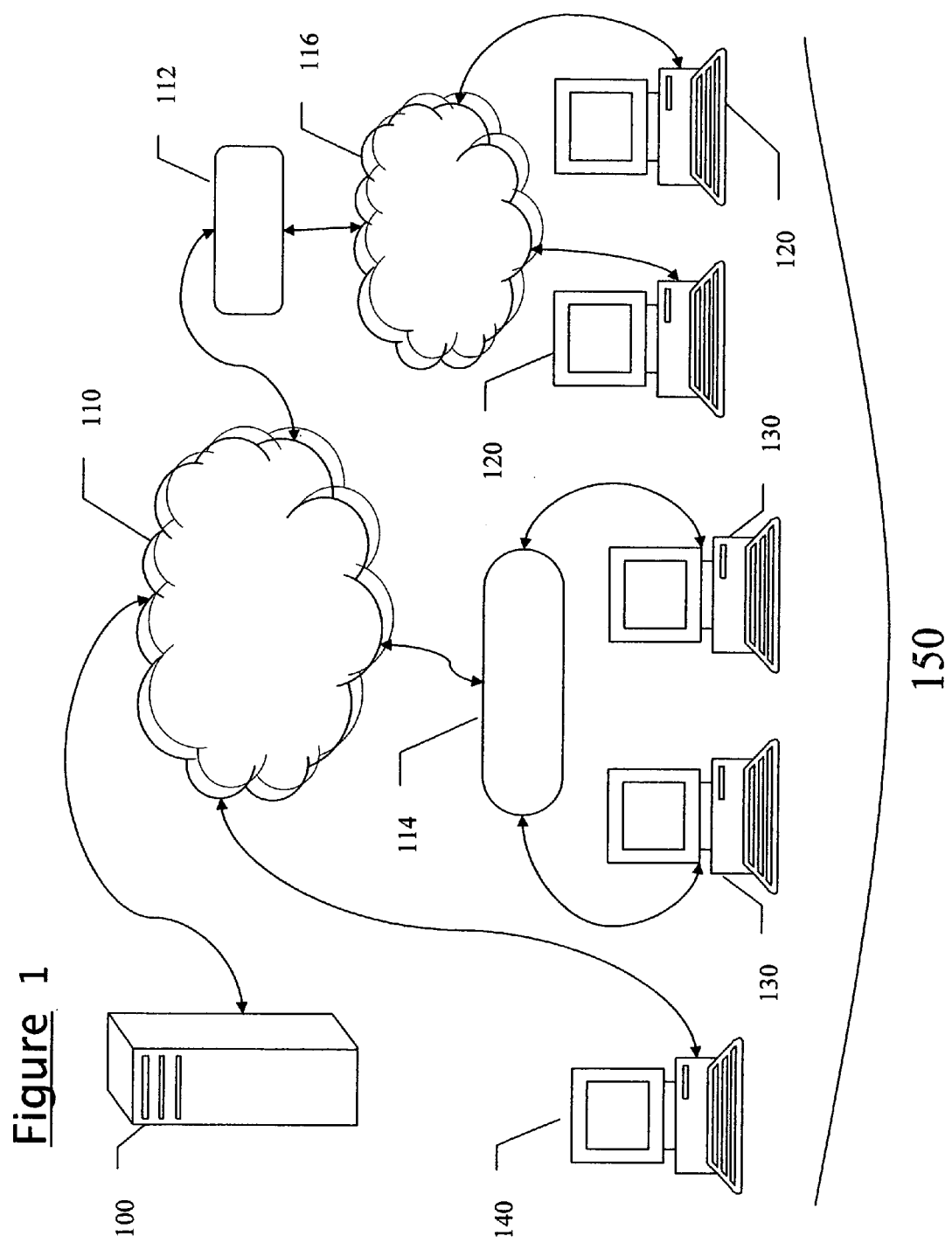
FIG. 1 is a block diagram of a network system on which the present invention may operate.

Referring now to FIG. 1, a diagram illustrates the network environment in which the present invention can operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 2A:
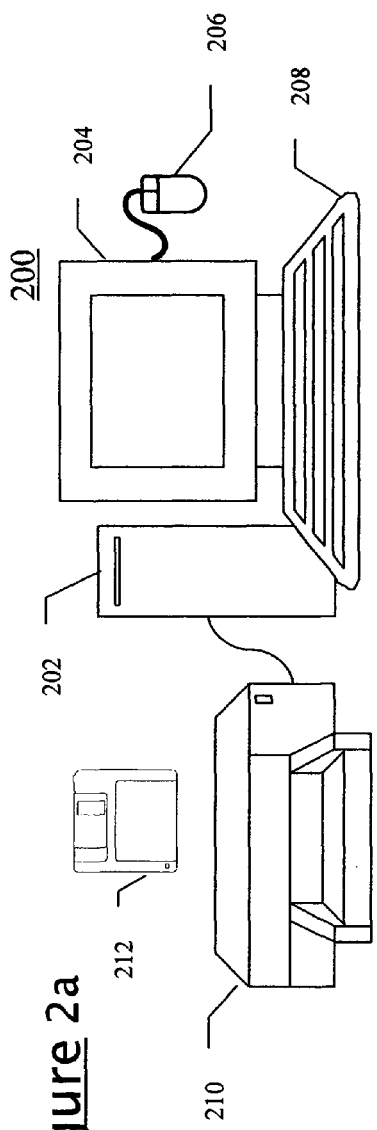
FIGS. 2a and 2b are a block diagram of a computer system on which the present invention may operate.
Figure 2B:
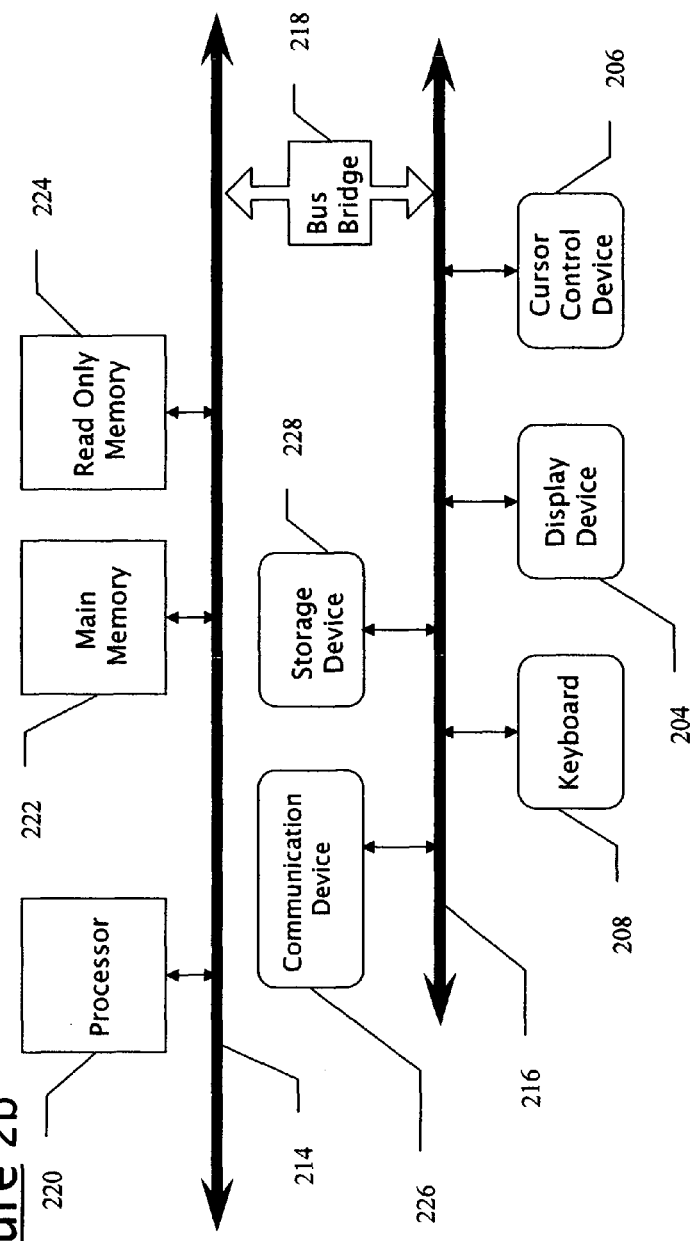

Having briefly described one embodiment of the network environment in which the present invention may operate, FIGS. 2a and 2b show an example of a computer system 200 illustrating an exemplary client 150 or server 100 computer system in which the features of the present invention may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of the present invention includes software, information processing hardware, and various processing steps, which will be described below. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications systems.

The present invention is a computer-implemented method and system for enabling anonymous communications between networked users based on common search queries. Various embodiments of the present invention will be described below. In particular, the use of the present invention with various types and formats of user interface presentations will be described. It will be apparent to those of ordinary skill in the art that alternative embodiments of the implementations described herein can be employed and still fall within the scope of the claimed invention. In the detail that follows, various embodiments of the present invention are described as implemented in computer-implemented processing logic denoted herein as the "Software". As described above, however, the claimed invention is not limited to a purely software implementation.

In general, the present invention is a mechanism for enabling communication among people who share an interest, however fleeting, but who would otherwise never interact. They would perform similar searches, possibly even browse the same web page, but never have any knowledge that another person may have similar interests.

Using this invention, a person need not be a member of any group or community to be able to communicate with another person, and a person's search query need not represent a long-standing interest in a certain topic. People may connect in an immediate and serendipitous way based on potentially transitory and fleeting interests. They do not need to run standalone applications on their client system, register, or establish a profile.

For example, a person might search on the Internet for a news story about a celebrity spat with a paparazzo. She reads the article, feels strongly about it and wants to share opinions with another person. Due to the short-lived nature of the news story, it is likely that there wouldn't be any groups or communities formed around the story, and the user would be unable, using existing technologies, to find a way to communicate with another person regarding that story. It would be advantageous to instantly communicate, without joining any group or community, to express her views with another person who has also searched for the same news story.

In another example, a man will be running the Portland marathon the coming weekend and has done a search on the elevation profile of the course. The system notifies him that another person has done a similar search, and enables him to start a dialogue with the other person. They exchange race-day strategies and decide to run the race together.

In another example, a person searches for top-of-the-line router bits for an upcoming woodworking project. While browsing web sites with information on router bits, he receives a notice that someone wants to talk with him. He accepts the connection and begins communicating with the other person. It turns out the other person has years of experience in woodworking and not only offers suggestions about the router bits, but also provides some great tips for the person's project as well.

Important elements of the present invention include: no user registration requirements of any sort, no need for application-specific software installation, firewall-friendly HTTP communication, and complete user anonymity. One embodiment of the present invention uses HTTP communication. However, it will be apparent to those of ordinary skill in the art that other communication protocols, methods, and infrastructures can equivalently be used to practice the invention claimed herein. These features of the present invention will be described in more detail below.

Simplicity and ease-of-use are crucial for widespread adoption of a technology. User registration requirements are a hassle and deter some people from using communication technologies. To join a chat room, use an instant messaging client, or post to a news group, some sort of user registration is required in prior art systems. The user registration may be as simple as providing a user name and password. However, some users may not want to provide any identifying information. User registration may often require providing an email address. Many users are hesitant to provide an email address for fear of spam. Web commerce experts agree that each extra click required of users diminishes the number of users who complete a transaction. The present invention is streamlined down to a single-click of a link or button to enable communication with another person.

In keeping with the philosophy of simplicity, one embodiment of this invention uses JavaScript and Java, both of which come standard in most browsers. Users do not have to manually load or install any custom (application-specific) software. In the case where a user does not have a Java-enabled browser, an automatic installation of Java can be initiated, requiring only that the user click an OK button.

With growing concerns about computer security, many computers are protected by firewalls, which often block traffic on ports other than the standard HTTP port. To ensure firewall compatibility, one embodiment of this invention uses only HTTP to communicate between client and server. Additionally, firewalls may block incoming connections to the HTTP port, so in this one embodiment, all communication is initiated by the client.

Also in this embodiment, complete user anonymity is maintained on all clients. The server has access to client IP addresses and potentially machine names/ID's, but the clients are never privy to this information. Clients use a unique identifier that identifies a particular conversation, but contains no client-specific identification.

In an example of the use of the present invention, the following hypothetical is illustrative. A user is searching the Internet for resources related to a certain concept. S/he would like to communicate in an immediate, anonymous manner with another user who is searching for similar resources, in order to share ideas, experiences, expertise, etc. When the user receives a search results page, by clicking a link or button, s/he can initiate communication with another user who has searched for a similar topic. The other user will be notified by the present invention, and the two users may begin communicating. Users can maintain multiple conversations with multiple users on multiple topics at the same time.

In one embodiment, users communicate anonymously and are not required to register any personal information. The communication medium may be text, voice, sound, video, and/or any other form of communication appropriate for Internet transmission.

Figure 3:
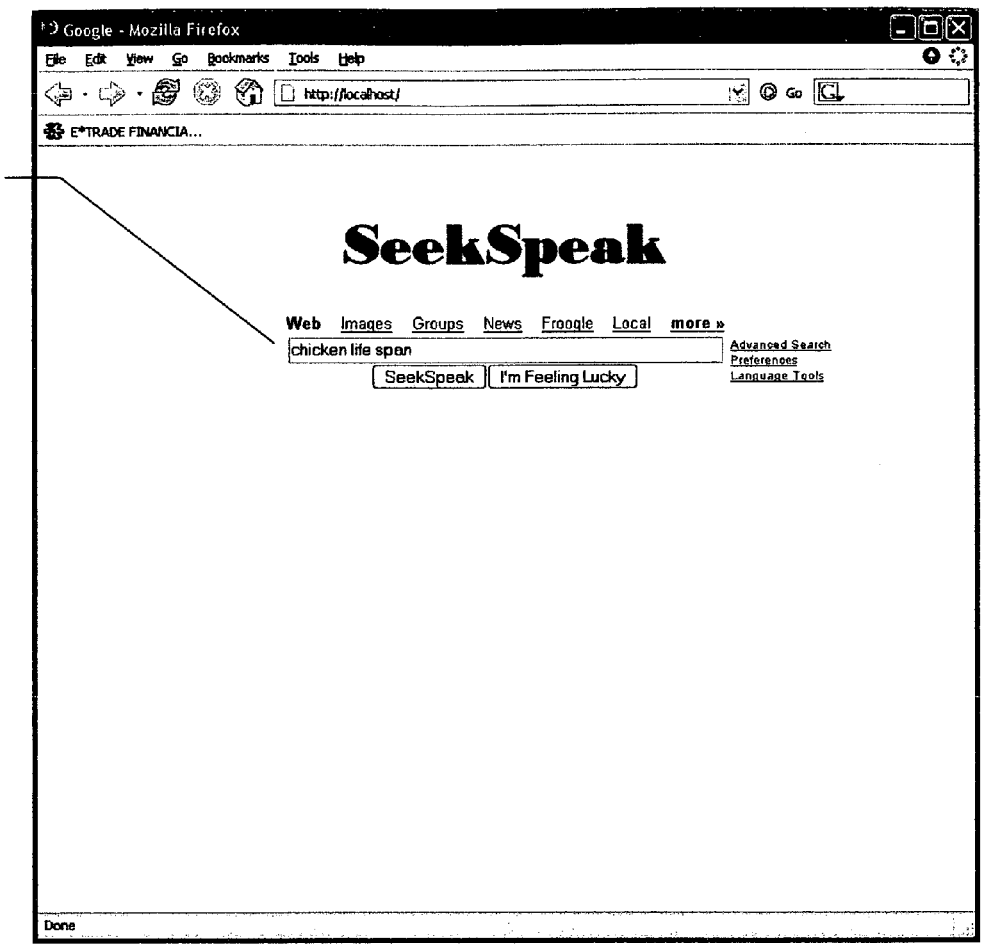
FIG. 3 is a screen shot example of a search query entry.
Figure 4:
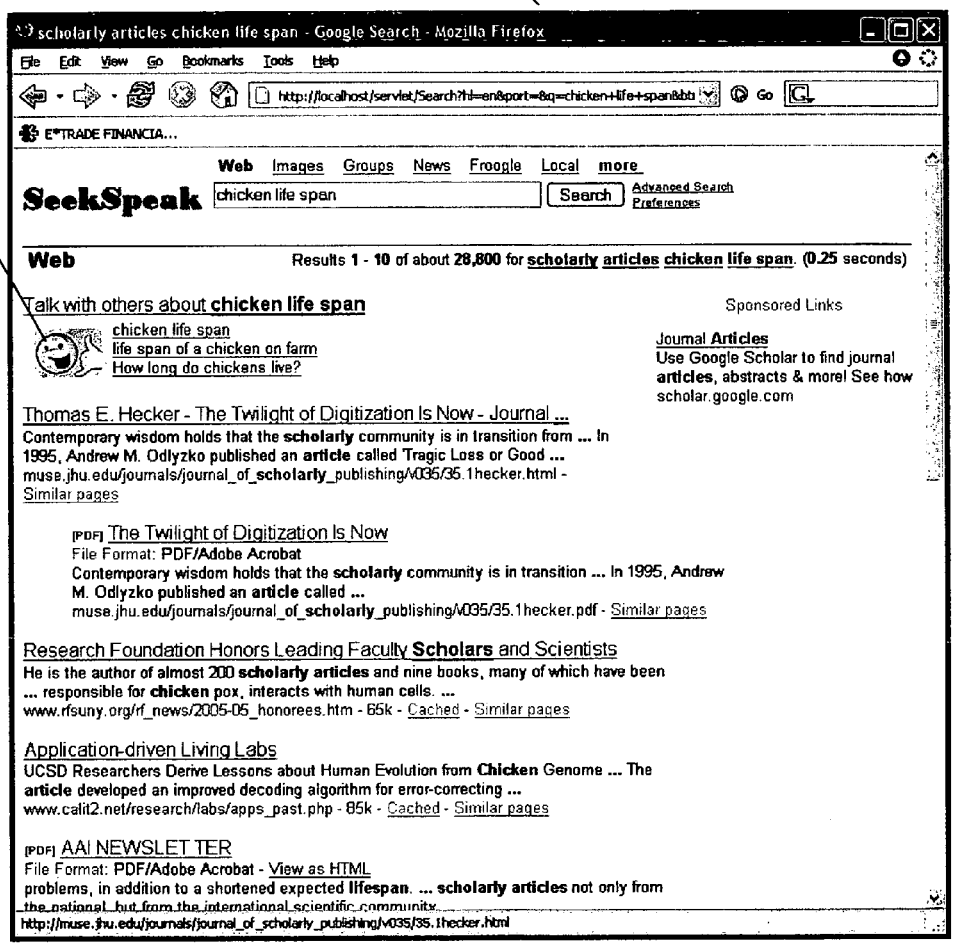
FIG. 4 is a screen shot example of a search query results page.
Figure 5:
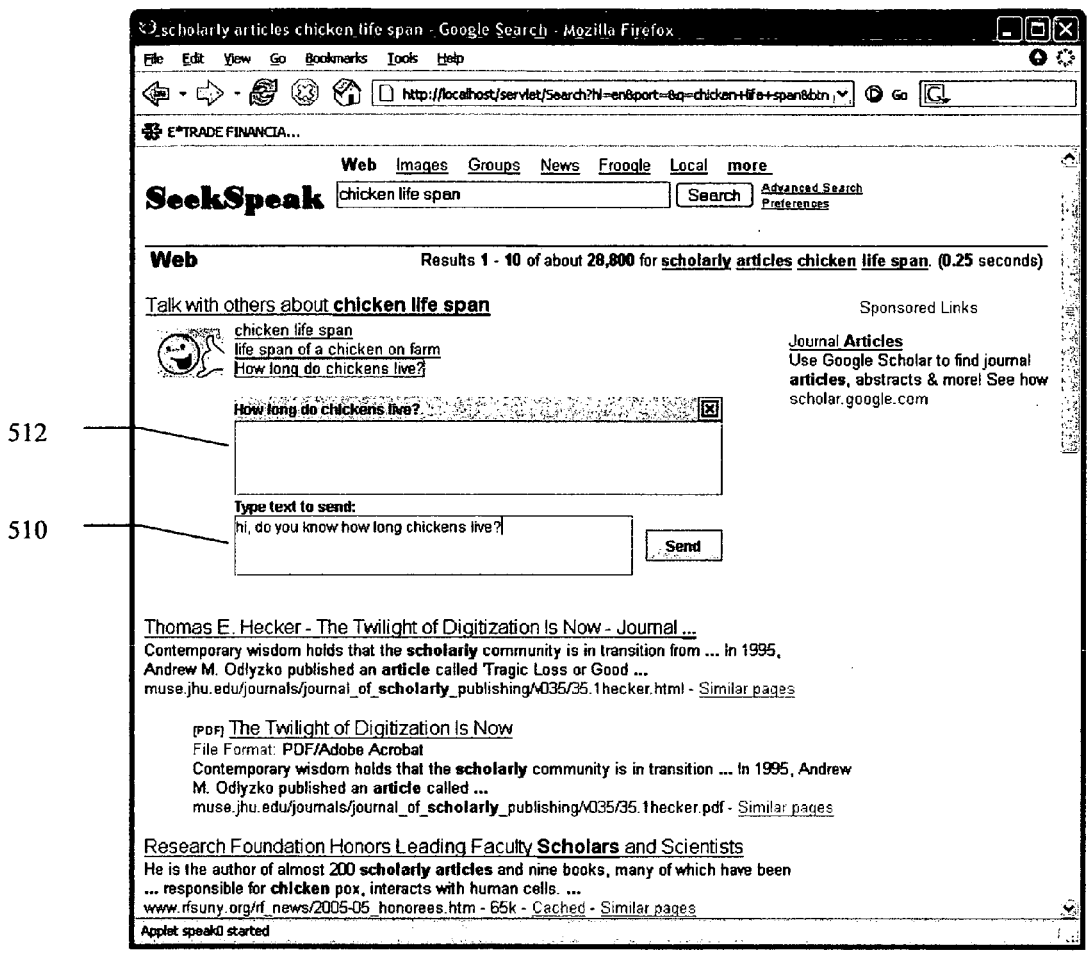
FIG. 5 is a screen shot example of a search query results page with a transmitted text box and a received text box.

Referring to FIG. 3, an example of the use of the present invention is provided. In this example, a User A submits a search query 310 on, for example, "chicken life span" to a search engine as shown in FIG. 3. As a result of this search query 310 submittal, the search engine returns a results page 410. FIG. 4 illustrates the results page 410 received by User A. As a part of this results page 410, the present invention inserts an invitation 412 to communicate with others who have entered a search query that is the same as, or similar to, the query submitted by User A. As will be described in more detail below, the present invention matches users who have submitted similar queries within a user-configurable time period. Once the system has matched two or more users with similar search queries, the system generates invitations 412 in the form of links on results page 410. At this point, User A can click on any of the invitation links, which brings up a communication applet. In this case, User A clicks on the link "How long do chickens live?". In one embodiment as shown in FIG. 5, the communication applet displays a transmitted text box 510 and a received text box 512. It will be apparent to those of ordinary skill in the art that such communication displays or user interfaces could be combined into a single text transfer box. These text boxes are more generally referred to herein as user interface components. User A can then type a message into transmitted text box 510 and click the Send button.

Figure 6:
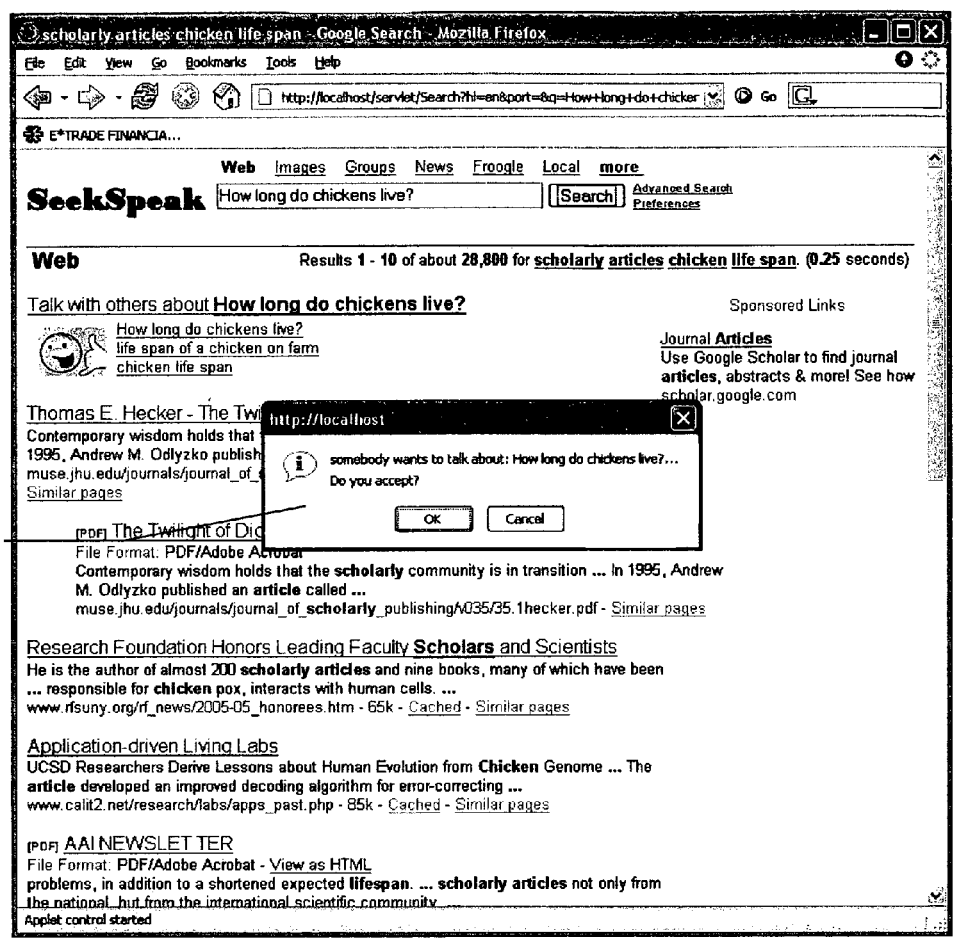
FIG. 6 is a screen shot example of a search query results page with an alert dialog.
Figure 7A:
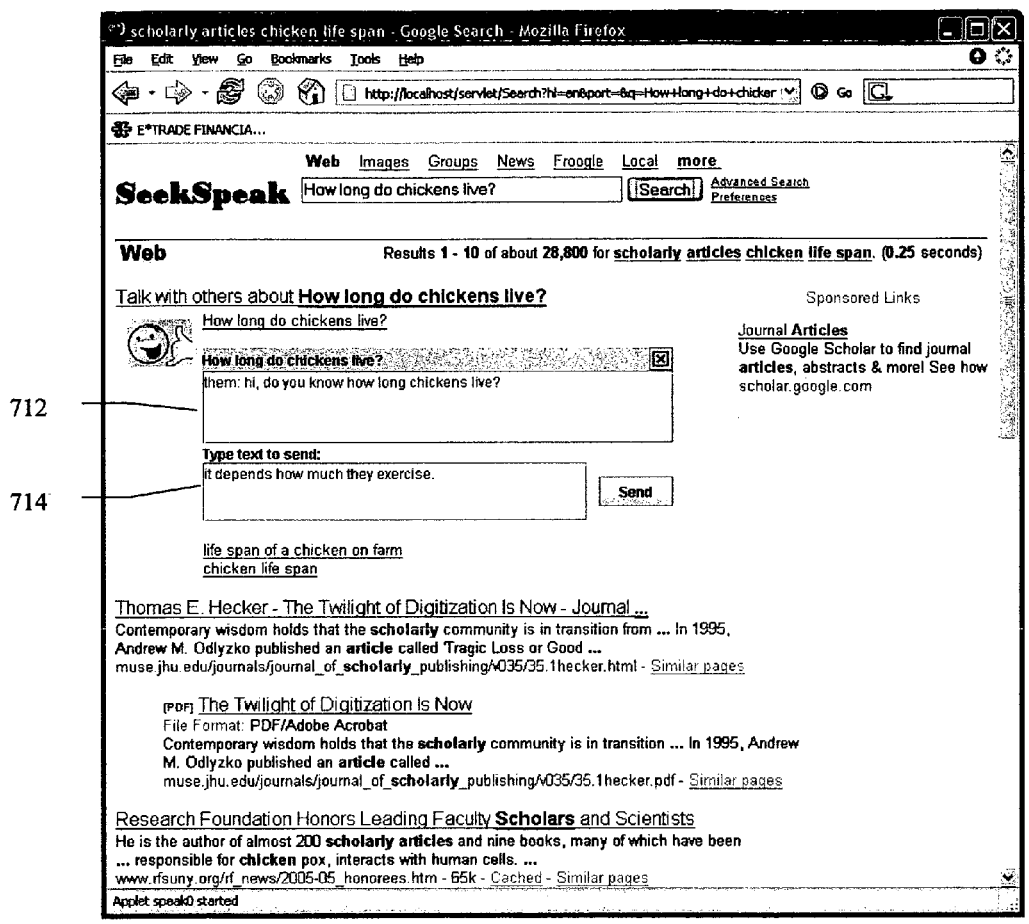

User B, who has previously within a pre-defined time period, searched on "How long do chickens live?", receives an alert dialog 610 (see FIG. 6) from the present invention indicating that someone (i.e. User A) is sending a message to User B. User B, via the alert dialog 610, is thereby invited to communicate with User A. If User B accepts the communication by clicking a button in alert dialog 610, the present invention activates a communication applet on User B's system and displays a received text box 712 and a transmitted text box 714 (see FIG. 7a). The message sent by User A is presented in received text box 712. The present invention also accepts text input from User B in transmitted text box 714 and sends this text message to User A for display in User A's received text box 722 (see FIG. 7b). User A thereby receives the message that User B has typed and sent. Communication continues between the two users until either or both of them close the communication applet or their browser window. If User B declines the communication by clicking a second button in alert dialog 610, the system attempts to match another user with a similar search query. If another matching user is found, the system sends an alert dialog 610 to the next matching user (i.e. User n) indicating that someone (i.e. User A) is sending a message to User n. User n, via the alert dialog 610, is thereby invited to communicate with User A. If User n also declines the communication and no other matching user is found who accepts the communication request from User A, the system responds to User A with a message that no matching users are available.

Having described one embodiment of the basic operation of the present invention, the design implementation of one embodiment will now be described.

Figure 8:
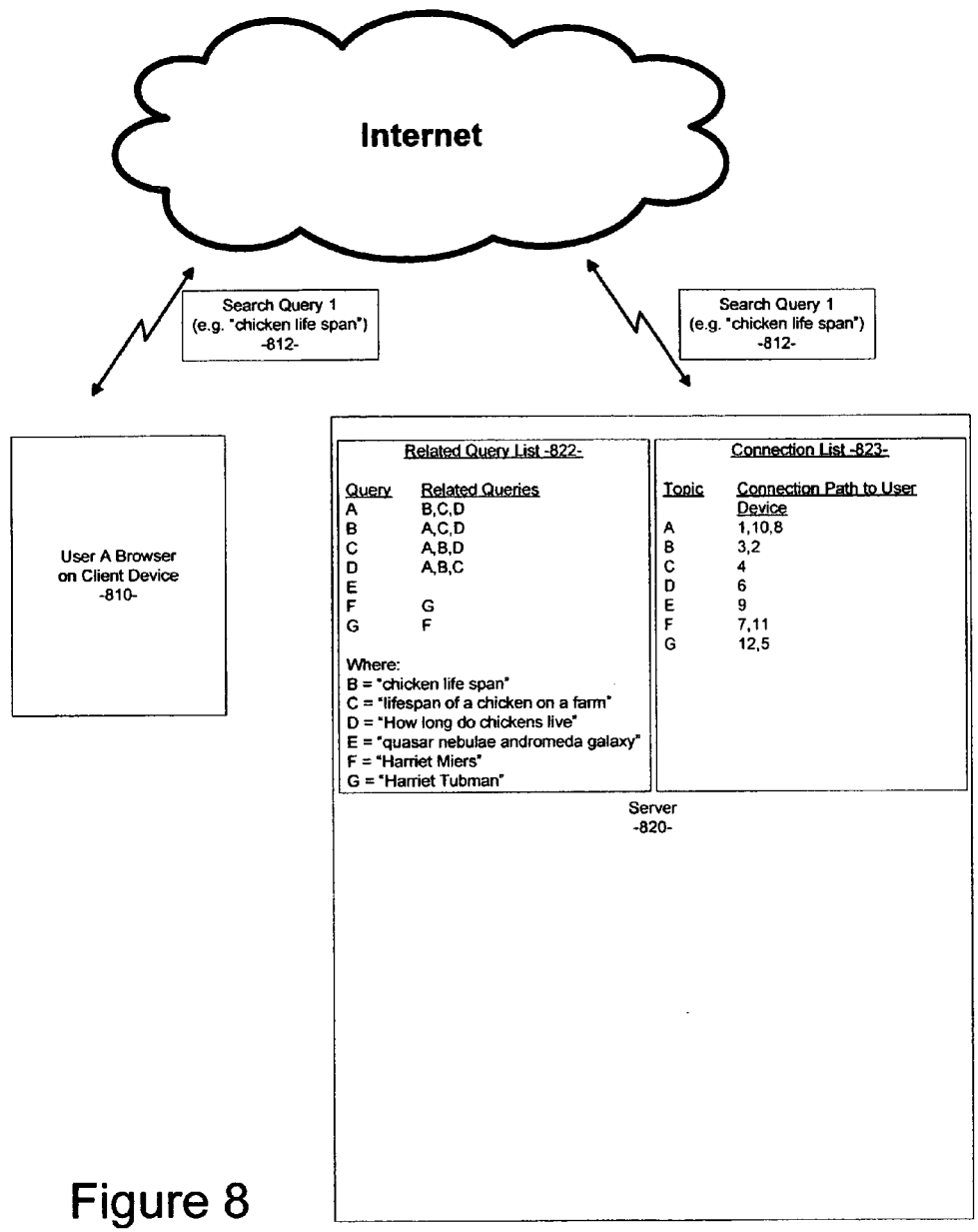
FIG. 8 illustrates the interaction between client and server when a search query is submitted.

As described above and referring to FIG. 8, a user (e.g. User A on a client device 810) initially submits a search query 812 in a search request to a search engine on a server 820 via a network. In one embodiment, the server 820 extracts the user's search query and machine address (or other communication mechanism, like a socket connection or URI) from the search request and records the extracted data in two data structures. A first data structure is a related query list 822. Related query list 822 forms a relationship between a given search query and all related search queries considered similar to or exactly the same as the given search query. As shown in FIG. 8, related query list 822 identifies all related queries for each given search query. When server 820 receives a new search query 812 from a client user, server 820 searches the related query list 822 to determine if there are similar search queries submitted by other users. In a second data structure 823, server 820 maintains a list of given search queries with corresponding connection information that defines the connection path to the user who submitted that given search query. In this manner, server 820 can receive a search query 812 and then use lists 822 and 823 to find a connection path to all user devices from which similar search queries were received. Also, when server 820 receives a new search query 812, server 820 adds the new search query to the related query list 822, updates related query list 822 with a definition of other search queries considered similar to the newly entered search query, and adds the connection path information for the originator of the new search query 812 (e.g. User A) to the connection list 823. Using the information obtained from lists 822 and 823, Server 820 generates a search results page for User A. In the search results page (see FIG. 4, item 410) returned to the user, a list of related search queries recently submitted to the search engine by other users is presented to the user (see FIG. 4, item 412). These related search queries are obtained from the search queries retained by server 820. It will be apparent to those of ordinary skill in the art that search engine technologies exist in the prior art for finding and ranking search strings to identify similar search requests. If server 820 finds one or more similar search queries in related query list 822, server 820 displays these similar search queries in an invitation (see FIG. 4, item 412) on the search results page. If the user selects one of the displayed search queries in invitation 412 (i.e. the user wishes to communicate with the originator of the similar search query), server 820 retrieves a connection path corresponding to the selected search query from the connection list 823. Server 820 then uses the retrieved connection path to initiate communication between the two users in the manner described above. If the user wishes to communicate concurrently with a different user, the process is repeated. For voice, video, or any other kind of streaming data, the server would keep sockets open to both clients and simply forward any received data to the target client.

Figure 9:
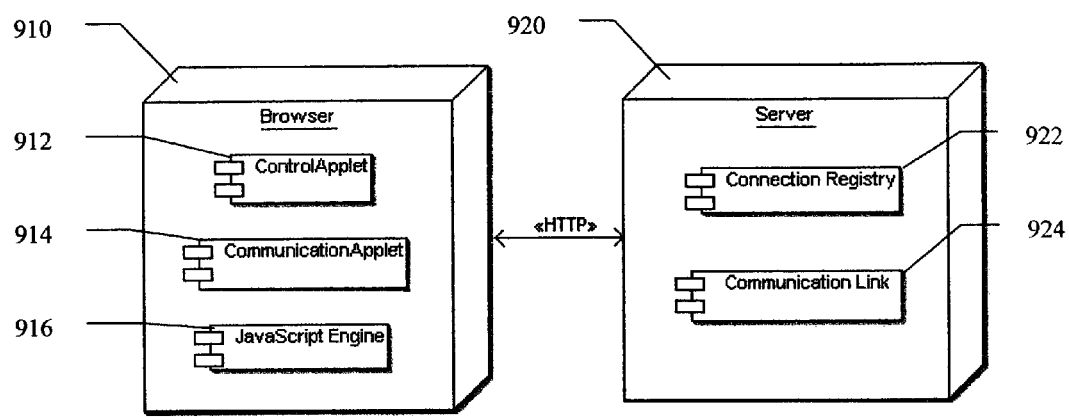
FIG. 9 illustrates the basic components within the client and server.
Figure 10:
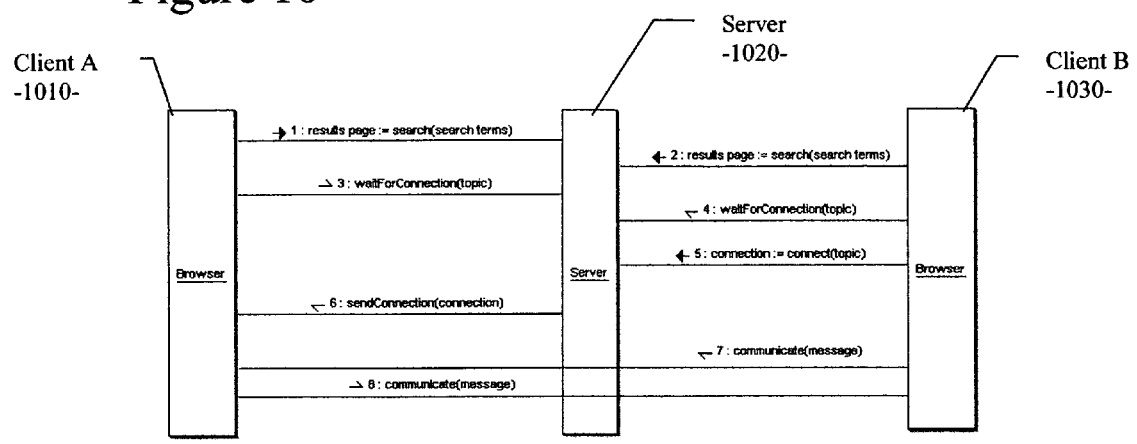
FIGS. 10 and 11 illustrate the basic sequence of operations of one embodiment.
Figure 11:
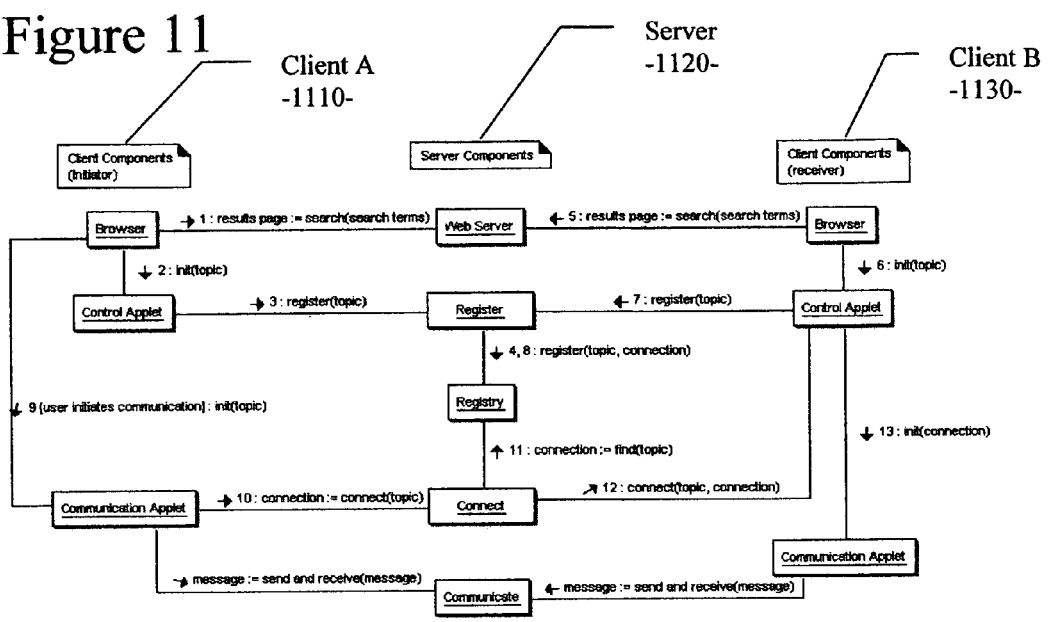

Referring to FIGS. 9-11, a detailed description of the components involved and their interactions in one embodiment is provided. Referring to FIG. 9, the basic client browser 910 components and basic server 920 components of one embodiment are shown. Browser 910 includes Control Applet 912, which registers with server 920 for a given search query and listens for incoming connections. Note that the registration performed by Control Applet 912 is different from user registration, which is not required in the present invention. Browser 910 also includes Communication Applet 914, which sends and receives messages to/from another Communication Applet in another client browser. In one embodiment, Browser 910 also includes JavaScript Engine 916, which enables manipulation of HTML DOM (Document Object Module) in a well-known manner. FIG. 9 also illustrates the basic server 920 components of one embodiment. These server 920 components include a Connection Registry 922, which retains information defining connections based on similar search terms. Server 920 also includes Communication Link 924, which enables communication among Communication Applets. In one embodiment, all communication between client and server occurs over HTTP. However, it will be apparent to those of ordinary skill in the art that other implementations of the claimed invention are possible with different protocols, methods, and infrastructures.

Given the browser and server components identified above, the interaction and function of these components is described below. In an initial sequence of operations, a user submitting a search query establishes a connection with the server 920. When a user performs a search over the Internet using a search engine, his/her machine sends an HTTP request to server 920. The server 920 extracts the search query from the user's request and embeds it in the returned HTML page within an APPLET tag, as a parameter to a Java Applet, called the Control Applet 912. Once loaded in a Java Virtual Machine running inside the user's browser, the Control Applet 912 opens an HTTP connection to the server 920 and identifies itself using the user's search query. The server 920 takes the connection with the Control Applet 912 and adds the connection to a list of connections (Connection Registry 922) in server 920 that are mapped to the user's search query (and potentially other similar search queries). The Control Applet 912 then waits for a response from the server 920 indicating that another user wishes to initiate communication.

In a secondary sequence of operations, a user submitting a search query establishes a communication link with another client browser. When a user wants to chat with another user, s/he clicks a link (see FIG. 4, invitation 412) on the search results web page to indicate s/he would like to start a conversation about a searched query. This selected link invokes a JavaScript call that adds a new Applet, a Communication Applet 914, to the Document Object Model of that HTML page. The Communication Applet 914 appears as the transmitted text box 510 and received text box 512 (see FIG. 5) within the HTML page being viewed by the user inside his/her browser window. The Communication Applet 914 allows for sending and receiving text, but the applet could easily allow for alternative modes of communication. The user may then type a message in transmitted text box 510 and click the Send button to send the message to another user via the server 920.

The Communication Applet 914 opens an HTTP connection to the server 920 and sends the search query and the sending user's message to server 920. The server 920 extracts the search query and retrieves the list of connections to other user machines (Connection Registry 922) that are associated with the given search query. The server 920 chooses one of these connections, which is a connection to the Control Applet 912 on the target machine (i.e. the machine of the user with which the sending user intends to communicate). The server 920 then generates unique IDs for both the initiating applet (source ID) and the receiving applet (target ID). These IDs are used to route messages to the appropriate recipient Applets.

Using the connection to the Control Applet 912 on the target machine, the server 920 sends the source ID, target ID, search query, and the sending user's message to the target user's machine. The Control Applet 912 on the target user's machine receives the source ID, target ID, search query, and the sending user's message, and makes a call to JavaScript Engine 916 via JSObject. The Control Applet 912 passes the source ID, target ID, search query, and the sending user's message to a JavaScript method. The JavaScript method displays a dialog box to the user to accept or reject the invitation and, if accepted, inserts a Communication Applet 914 into the HTML page's DOM (Document Object Model), which causes the Applet to appear to the target user. The JavaScript also inserts the source ID, target ID, search query, and the sending user's message as parameters to the new Communication Applet 914, which presents the search query and the message to the target user in its display. The Communication Applet 914 then opens an HTTP connection to the server 920 and waits for an incoming message from the other user.

When either user wishes to send a message to the other, the Communication Applet 914 sends the message and the target Communication Applet's unique ID to the server 920 via HTTP. The server 920 receives the message, looks up the target Applet connection in the Connection Registry 922 using the ID, and then sends the message to that target Communication Applet 914, which displays the message to the target user. Communication continues back and forth through Communication Link 924 of server 920 until a user closes his/her Communication Applet 914 or his/her browser window.

In a further description of the operation of one embodiment of the present invention, FIGS. 10 and 11 illustrate the sequence of events between user browsers and the server as users submit search queries to the server and activate links to communicate with other users. It will be apparent to those of ordinary skill in the art upon reading the description above that the sequence of events and actions set forth below can be implemented in one embodiment of the present invention. A first example of the sequence of events is illustrated in FIG. 10. The numbered events set forth below correspond to the numbered events illustrated in FIG. 10.

1) Client A 1010 submits a web search using certain search terms to server 1020.
2) Client B 1030 submits a web search using similar search terms to server 1020.
3) Client A 1010 waits for an incoming connection.
4) Client B 1030 waits for an incoming connection.
5) Client B 1030 indicates to Server 1020 that User B wishes to connect to another user.
6) Server 1020 notifies Client A 1010 of the incoming connection and passes a connection to Client B 1030.
7) Client B 1030 receives a connection to Client A 1010 from Server 1020.
8) Client A 1010 sends a message to Client B 1030.
9) Client B 1030 sends a message to Client A 1010.

A second example of the sequence of events in one embodiment is illustrated in FIG. 11. The example of FIG. 11 illustrates a sequence of events and actions as users collaborate in a communication enabled by the present invention. The numbered events set forth below correspond to the numbered events illustrated in FIG. 11.

1) Client A 1110 submits a web search request and receives a results page.
2) The HTML in the results page causes the Client A 1110 browser to initialize a Control Applet.
3) The Client A 1110. Control Applet registers itself with the server 1120.
4) The server 1120 enters the connection to the Client A 1110 Control Applet into the Connection Registry.
5) Client B 1130 submits a web search request and receives a results page.
6) The HTML in the results page causes the Client B 1130 browser to initialize a Client B 1130 Control Applet.
7) The Client B 1130 Control Applet registers itself with the server 1120.
8) The server 1120 enters the connection to the Client B 1130 Control Applet into the Connection Registry.
9) The Client A 1110 browser creates a new Client A 1110 Communication Applet in response to a user action indicating that s/he wants to initiate communication with another user who submitted a similar search query (e.g. the user of Client B 1130).
10) The Client A 1110 Communication Applet requests from the server 1120 a connection to another user based on a given search query.
11) The server 1120 retrieves a connection to another user (target) based on the search query as retained in the Connection Registry.

12) The server 1120 sends a message to the Client B 1130 Control Applet (i.e. the target machine), passing the details of the Client A 1110 connection to the Client B 1130 Control Applet.

13) The Client B 1130 Control Applet initializes a new Communication Applet using the details of the Client A 1110 connection just received from the server 1120.

14) The two Communication Applets send messages back and forth.

For voice, video, or any other kind of streaming data, the server would maintain persistent socket connections to both clients and simply forward any received data to the target client. In one embodiment, the client Applet is capable of both capturing and rendering voice, video, etc. Sun Microsystems, Inc. provides a media application program interface (API), the Java Media Framework, that supports both streaming audio and video using the public standard RTP and RTSP protocols. In one embodiment, this API is used to provide streaming voice and video within an Applet. No special media player installation is required as the Applet itself contains all necessary logic for communicating with input/output devices on the local system and transmitting streaming data to the server. For local capture of audio or video content, special security permissions might be required on the host machine. For voice or video communication, conventional computers provide the necessary input and/or output devices for the desired media type.

If a local media player is already installed and its use is desired, the Applet simply acts as the trigger for launching the appropriate media player with the necessary launch settings, like target URLs, etc. If an external media player is not yet installed, but, its use is desired, the Applet acts as the mechanism for facilitating the download and installation of the media player.

In other embodiments, the present invention does not interact with an external media player, but uses the Applet alone to enable communication. In these embodiments, the present invention provides options for text, voice, and/or combined voice and video communication (a.k.a. videoconferencing). In these embodiments, the invitation area of the search results page contains multiple invitation sections, one for each type of media. Each invitation section contains special communication links, and the type of communication initiated would depend on the type of the invitation link chosen.

In the case of voice communication, clicking a voice communication invitation link displays a voice Applet instead of a text Applet. The user interface for the voice Applet enables the user to transmit and receive the voice communication and to end the communication when desired. Other controls for volume, local output device (speakers, headphones, etc.), etc. are provided as well. After the user clicks the invitation link for a voice communication, the server attempts to find a conversation partner based on the search query in the selected link as described above. As described, the server retrieves a list of users who had recently searched for the query in the selected link, or a query similar thereto. The server uses this list of users and polls each user on the list to determine whether or not each user wishes to initiate a conversation with another person on the chosen topic. Once a user agreeing to a voice communication is found, the server connects the two users for voice communication. In other words, at this point a voice connection between the two users via the server is established (i.e. streaming data sent from one machine to the server is routed to the appropriate target machine). Once the voice connection is established, a voice communication between the two users is created and the two users can converse by talking into an input device (e.g. microphone) and listening over an output device (e.g. speakers or headphones). If the server does not find another user interested in communicating about the chosen search query by voice, the server notifies the initiating user that no voice conversation partner could be found.

In the case of videoconferencing, clicking a videoconferencing invitation link causes the display of a videoconferencing Applet that contains a video display area, along with controls for communication settings and for terminating the videoconferencing conversation. Again, after the user clicks the videoconferencing invitation link, the server finds a videoconferencing conversation partner based on the search query in the selected link using the process described above. Once a videoconferencing conversation partner is found, the server connects the two users and videoconferencing commences using the videoconferencing Applet and the input/output devices on their local computers. If the server does not find another user interested in communicating about the chosen search query by videoconferencing, the server notifies the initiating user that no videoconferencing conversation partner could be found.

User registration requirements deter many users from using existing communication technologies. With the present invention, the user is never required to enter personal or identifying information. Because all requests are initiated by the clients, the server simply responds to client requests and never needs to look clients up or address them by a registered identifier. Specifically, the present invention avoids the need for user registration by maintaining references to the TCP sockets involved in the HTTP client requests, although other schemes are possible.

Because the present invention uses JavaScript and Java Applets, no application-specific custom software needs to be installed on the client device. JavaScript and Java are standard on most browsers. The JavaScript and Java Applet code is downloaded seamlessly to the client in response to the client request for a certain URL. No action is required on the part of the user to download and run the code.

Many firewalls only allow communication on the standard HTTP port. The present invention uses only HTTP communication on the standard HTTP port and should be compatible with any firewall that allows HTTP access. Many firewalls allow outgoing connections on certain ports, but not incoming connections. Therefore, in the preferred embodiment, all communication is initiated via outgoing connections from the client to the server.

The Java HttpURLConnection class transparently supports proxy communication. Using this Java class enables proxy support in the web search/communication application of the present invention. Further, one embodiment supports interoperability because all clients use the same JavaScript and Java Applets. In addition, the present invention can support any devices that use TCP/IP, including mobile phones, PDAs, etc.

In one embodiment, privacy is maintained because users can choose not to accept an incoming request to communicate. Users can also opt-out of communication at any time by closing a specific conversation or by closing the browser page containing search results.

One embodiment also maintains user anonymity because no client identification information is ever transmitted to other users. The client uses an arbitrary unique identifier to identify particular conversations, not target hosts. Only the server has knowledge of client IP addresses and machine names/ID's.

In the embodiment described herein, a client/server model is used wherein all communication between two users is mediated by a server. This implementation was chosen in the preferred embodiment for firewall-friendliness. However, the present invention and the implementations described herein are equally applicable in peer-to-peer networks. The present invention could easily be implemented using peer-to-peer communication. The server could provide connection information to the two clients, and the clients could connect directly to each other and handle the communication on their own.

The peer-to-peer approach has the advantage of reducing the processing burden on the server. However, the peer-to-peer approach has the disadvantage of being inoperable with many firewalls and weakening the anonymity of the communicating users. Each client would be talking directly to another IP address, which could potentially be traced through an Internet Service Provider to a particular individual.

In another alternative embodiment, URIs (Uniform Resource Identifiers) could be used in the search results page. In this embodiment, instead of returning a list of communication links in the search results page that launch Java Applets, direct URIs could be used instead. These URIs could specify protocols that would be used by the browser to launch helper applications to handle the connection to and communication with another user. For example, a communication URI could specify: "im://user@users.com". When clicked, this URI would cause the browser to launch an Instant Messaging client and connect to the user: user@users.com, for example.

One advantage of this alternative embodiment is that users could have more flexibility in choosing the communication applications they use, instead of being restricted to the Applet provided in the preferred embodiment. However, the URI embodiment also has numerous disadvantages. This approach requires that the clients install helper applications on their machines before using the system. Installation of helper applications would presumably register the protocol for use with that application. The URI embodiment also requires that a user register and establish a URI, and that there be a mechanism for registering a user's URI with the server when a user initiates a search. Users would have to have a separate application running concurrently with their browser in order to receive incoming connections from other users. Lastly, anonymity would be greatly weakened because a user's URI could be plainly visible in the HTML of the results page. Even if the user's URI were somehow hidden, the client application would need to know the target user's URI.

Although the embodiments included herein describe communications between two users, the same techniques described here can be used to allow multiple people to participate in a single conversation.

Thus, a computer-implemented method and system for enabling anonymous communications between networked users based on common search queries is disclosed. While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

I claim:

1. A computer-implemented method comprising:
   receiving a particular search query from a particular user via a network;
   receiving a plurality of search queries from a plurality of different users via the network;
   using a data processor to determine if the particular search query from the particular user and any of the plurality of search queries from the plurality of different users fit within match criteria, the match criteria being based on a similarity of terms in the particular search query as compared with terms in the search queries from the plurality of different users;
   in response to receipt of the particular search query from the particular user, generating for the particular user, if the particular search query and any of the plurality of search queries from the plurality of different users fit within the match criteria, one link for each of the plurality of search queries from the plurality of different users that matches the particular search query, each link being a user interface element that can be activated by the particular user, each link including at least a portion of a matching search query submitted by one of the plurality of users, each link being an invitation enabling the particular user to establish communication with one of the plurality of users who submitted the matching search query, the invitation being accepted by activation of a link, the invitation being declined by non-activation of a link; and
   upon activation of a particular link by the particular user, establishing network communication between the particular user and one of the plurality of users who submitted the matching search query corresponding to the particular link.

2. The method as claimed in claim 1 wherein the communication is established without installing application-specific software on a system operated by the particular user or the plurality of users.

3. The method as claimed in claim 1 wherein the communication is established anonymously between the particular user and the one of the plurality of users.

4. The method as claimed in claim 1 wherein the communication established between the particular user and the one of the plurality of users is accepted by a firewall on the system operated by the particular user or the one of the plurality of users.

5. The method as claimed in claim 1 wherein the communication is established using HTTP communication.

6. The method as claimed in claim 1 wherein the communication includes text messaging.

7. The method as claimed in claim 1 wherein the communication includes voice messaging.

8. The method as claimed in claim 1 wherein the communication includes video communication.

9. The method as claimed in claim 1 including sending a confirmation request to the one of the plurality of users prior to establishing the communication between the particular user and the one of the plurality of users.

10. The method as claimed in claim 9 wherein the one of the plurality of users may decline the request to communicate.

11. The method as claimed in claim 1 including displaying a user interface component on a display device of the one of the plurality of users after establishing the communication between the particular user and the one of the plurality of users.

12. The method as claimed in claim 1 wherein the communication is established without requiring registration by the particular user or the one of the plurality of users.

13. A server comprising:
   a network interface to facilitate communication via a network;
   a search query receiver to receive a particular search query from a particular user via the network, the search query receiver further to receive a plurality of search queries from a plurality of different users via the network;

a related query processor to determine if the particular search query from the particular user and any of the plurality of search queries from the plurality of different users fit within match criteria, the match criteria being based on a similarity of terms in the particular search query as compared with terms in the search queries from the plurality of different users, the related query processor further to, in response to receipt of the particular search query from the particular user, generate for the particular user, if the particular search query and any of the plurality of search queries from the plurality of different users fit within the match criteria, one link for each of the plurality of search queries from the plurality of different users that matches the particular search query, each link being a user interface element that can be activated by the particular user, each link including at least a portion of a matching search query submitted by one of the plurality of users, each link being an invitation enabling the particular user to establish communication with one of the plurality of users who submitted the matching search query, the invitation being accepted by activation of a link, the invitation being declined by non-activation of a link; and a communication component to, upon activation of a particular link by the particular user, establish network communication between the particular user and one of the plurality of users who submitted the matching search query corresponding to the particular link.

14. The server as claimed in claim 13 wherein the communication is established without installing application-specific software on a system operated by the particular user or the plurality of users.

15. The server as claimed in claim 13 wherein the communication is established anonymously between the particular user and the one of the plurality of users.

16. The server as claimed in claim 13 wherein the communication established between the particular user and the one of the plurality of users is accepted by a firewall on the system operated by the particular user or the one of the plurality of users.

17. The server as claimed in claim 13 wherein the communication is established using HTTP communication.

18. The server as claimed in claim 13 wherein the communication includes text messaging.

19. The server as claimed in claim 13 wherein the communication includes voice messaging.

20. The server as claimed in claim 13 wherein the communication includes video communication.

21. The server as claimed in claim 13 wherein the related query processor to send a confirmation request to the one of the plurality of users prior to establishing the communication between the particular user and the one of the plurality of users.

22. The server as claimed in claim 21 wherein the one of the plurality of users may decline the request to communicate.

23. The server as claimed in claim 13 including a mechanism to display a user interface component on a display device of the one of the plurality of users after establishing the communication between the particular user and the one of the plurality of users.

24. The server as claimed in claim 13 wherein the communication is established without requiring registration by the particular user or the one of the plurality of users.

25. The method as claimed in claim 1 wherein the link is presented to the particular user in a search results page.

26. The server as claimed in claim 13 wherein the link is presented to the particular user in a search results page.

27. The method as claimed in claim 1 wherein the link can be activated by a user clicking on the link.

28. The server as claimed in claim 13 wherein the link can be activated by a user clicking on the link.

29. The method as claimed in claim 1 wherein the one link is generated for each unique search query of the plurality of search queries from the plurality of different users.

* * * * *